United States Patent

[11] 3,561,548

[72] Inventor Thomas C. Mondshine, Houston, Tex.
[21] Appl. No. 865,677
[22] Filed Oct. 13, 1969
[45] Patented Feb. 9, 1971
[73] Assignee National Lead Company
New York, N.Y.
a corporation of New Jersey

[54] EMULSION MUD DRILLING
4 Claims, 1 Drawing Fig.

[52] U.S. Cl. ..................................... 175/65, 252/8.5
[51] Int. Cl. ..................................... E21b 21/04
[50] Field of Search ............................. 175/65, 66, 72; 252/8.5(P); 166/254; 175/50

[56] References Cited
UNITED STATES PATENTS

| | | | | |
|---|---|---|---|---|
| 2,661,334 | 12/1953 | Lummus | | 252/8.5 |
| 2,689,219 | 9/1954 | Menaul | | 252/8.5 |
| 2,793,996 | 5/1957 | Lummus | | 252/8.5 |
| 2,862,881 | 12/1958 | Reddie | | 252/8.5 |
| 3,373,106 | 3/1968 | Lister et al. | | 175/72X |

OTHER REFERENCES

Matthews et al., "How to Predict Formation Pressure and Pressure Gradient," Oil and Gas Journal, Feb. 20, 1967, pages 92, 93, 96, 98, 100, 105 and 106. 166/254

Primary Examiner—Stephen J. Novosad
Attorney—Delmar H. Larsen

ABSTRACT: A method is provided for determining the optimum salinity of and making adjustments to the dispersed aqueous phase of an oil base emulsion mud being used to drill through a shale bearing formation. The osmosity of the aqueous phase is adjusted, as by adding calcium chloride or sodium chloride or a mixture thereof, so as to be at least equal to the osmosity corresponding to the sum of the osmosity equivalent of the matrix stress pressure and the osmosity of the aqueous interstitial fluid in said shale bearing formation.

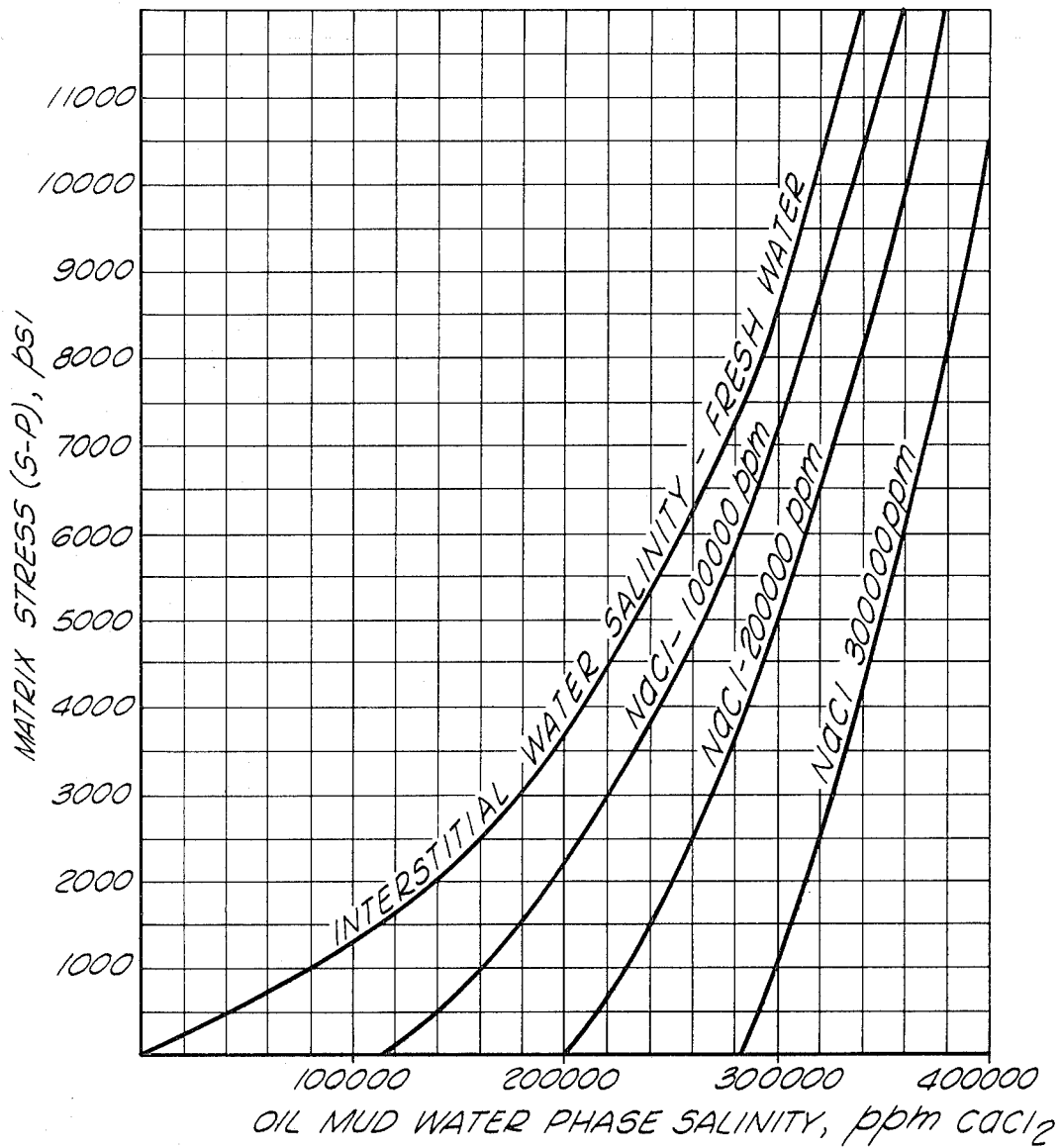

EMULSION MUD DRILLING

This invention relates to well drilling, as for oil and gas, using an oil base emulsion-drilling fluid, and more particularly provides a method for determining the optimum salt concentration for the aqueous phase of the mud, as such fluids are commonly termed, with particular reference to the stability of the formations drilled through.

In the drilling of wells for oil and gas, shale is frequently encountered, and often gives much difficulty to the driller. The Gulf Coast region of the United States is noteworthy in this respect, and certain sections were considered practically impossible to drill for many years, until improved drilling fluids and associated drilling techniques were developed.

An important factor contributing to the difficulty of shale drilling is the tendency of the shale to take up water from the drilling fluid. Since most shales contain swelling clays, this results in both an increase in volume and a loss of structural strength of the shale. Early attempts to combat this when drilling fluids were of the water base type included the loading of the mud with electrolytes, such as sodium and calcium chlorides, sodium silicate, and the like, since the presence of such salts tends to reduce swelling, This provided limited success, however, and many other types of water base methods have been developed and used with varying degrees of success.

More recently, shales have been frequently drilled with drilling fluids in which the continuous phase is oil, in which water is dispersed as an emulsified phase.

Even when the water in such a fluid is so dispersed, with each individual droplet completely surrounded by oil, it has been recognized by workers in the art that the water droplets were in some fashion capable of interacting with the shale formations with which the fluid was in contact. It was found advantageous to add electrolytes to the water phase of such an oil base emulsion mud, for the acknowledged and specific purpose of making the mud more inert to shale formations penetrated.

Thus, U.S. Pat. No. 2,599,752 discloses an oil base emulsion mud-containing alkaline earth metal salts such as calcium chloride, magnesium chloride, magnesium sulfate, and the like, as well as sodium chloride, to aid in drilling through formations containing hydratable clays.

U.S. Pat. No. 2,793,188 shows an oil base emulsion mud of the general type described in which a wide variety of salts containing polyvalent cations may be included, such as calcium chloride, zinc sulfate, lead chloride, and many others. Again, it is disclosed in this patent that the presence of such salts reduces the swelling of clays encountered during drilling.

Other patents teaching the inclusion of an electrolyte in the water phase of an oil base emulsion mud are U.S. Pat. Nos. 2,497,398; 2,550,054; 2,717,239; 2,793,996; 2,816,073; and 2,862,881; and Canadian Pat. Nos. 578,341. All of these show calcium chloride, and many show other salts as well.

It is clear that the addition of an electrolyte to an oil base emulsion mud will increase the overall cost of such a mud. Also, in many cases a relatively small amount of electrolyte may be added with no particular precautions having to be taken, but the use of a heavy concentration of electrolyte often requires additional measures to insure the stability and other desirable properties of the mud. A great need accordingly exists for a rational and accurate method of determining the optimum amount of electrolyte to be added to an oil base emulsion mud to insure that the mud will not adversely affect the stability of the particular formation being drilled through. Larger amounts of electrolytes may also give stability, but as mentioned, will represent an added expense and may require more supervision by the engineer, since it may decrease the stability of the emulsion mud.

A simple test much used in the past is simply to immerse a sample of the shale in a given mud and then to observe the behavior of the shale. Such a procedure is described and illustrated with photographs in Volume 19, Number 4 of the serial publication, "Silicate P's & Q's", Philadelphia, 1939. This shows the placing of a sample of shale in a beaker, loading it with a 200-gram weight and then filling the beaker with the fluid to be tested, so that any motion of the weight can be observed. This is thus a variety of dilatometry, in which the motion of the weight can obviously be followed as quantitatively as desired.

A fundamental difficulty with such a simple test is that the shale cutting under test, having been removed from the formation, which is generally at great depth and consequently under great compressional stress, is not longer in the state in which it would be when contacted with the drilling fluid under actual bottom hole drilling conditions. Such tests may therefore be a rough and ready guide, but often are misleading and never give results of the precision desired in modern day drilling.

For convenience in understanding the invention, it is helpful at this point to consider some fundamentals of that branch of physical chemistry which is concerned with osmotic forces. When an aqueous solution of a solute is separated from an aqueous solution of the same solute at a different concentration, or for that matter pure water, the solvent, which in this case is water, tends to migrate from the solution of lower concentration (or zero concentration, as the case may be), into the solution of higher concentration, thus setting up a pressure difference across the membrane which may be expressed in any convenient pressure unit, such as pounds per square inch. It is convenient to use the term real osmolality to express the effective concentration of solute. This term, which is widely used in biological disciplines, such as physiology and biochemistry, is fully defined with numerous examples and tables in the Geigy Scientific Tables, 6th Edition, Ardsley, New York 1962, pages 324—327. It is also defined in Handbook of Chemistry and Physics, Edition 47, page D-139, Cleveland, Ohio, 1966. Real osmolality is equal to the ratio of the real freezing point depression caused by the solute to the factor 1.858. The term, "ideal osmolality," is equal to molality multiplied by the number of ions into which the undissociated solute breaks down on complete dissociation.

For most actual solutes, and in particular, for those playing a part in the drilling fluids and formations treated by the invention, real osmolality differs from ideal osmolality by the well-known osmotic coefficient; the osmotic coefficient is the ratio of real osmolality to ideal osmolality. The osmotic coefficient for salts of interest may be found tabulated in various reference books, such as the Geigy publication already cited. Experimental data from which it may be readily calculated may be found in current editions of the Handbook of Chemistry and Physics, Cleveland, Ohio. Particularly useful tables, showing osmotic coefficients at various temperatures for a variety of salts at a wide range of concentrations, are given in the book, "Electrolyte Solutions", by R. A. Robinson et al. Plenum Press, New York, 1959.

From the above discussion, it will be clear that if two solutions have the same real osmolality, then they will have the same osmotic pressure, based upon the pure solvent at the same temperature.

In accordance with the present invention, account is taken of the fact that the surface hydration force of a shale in place in a formation being drilled through is essentially equivalent to the effective compaction force that expelled water from the shale in the course of the geological processes in which the clay was originally laid down as a sediment and in the course of geologic time overlaid with further sediments and thus subjected to ever-increasing compaction forces arising from the weight of the overburden. This effective compaction force is clearly the matrix stress, which on elementary hydraulic principles is equal to the overburden pressure minus the interstitial fluid pressure. During the course of drilling, enough information is generally at hand to estimate the matrix stress at any given depth with an accuracy sufficient for the purposes of the present invention. See, for example, the article by Matthews and Kelly, Oil and Gas Journal, Feb. 20, 1967, pages 92, 93, 96, 98, 100, 105, 106. Lacking any information whatsoever, the matrix stress for normally compacted shale may at a first approximation be taken to be, in pounds per square inch, about onehalf of the formation depth in feet. In formations in which the connate fluids are completely confined, which have come to be known as geopressured formations, the matrix stress and accordingly the shale surface hydration force, is somewhat less than one-half the formation depth in feet, measured in pounds per square inch, in view of the fact that the interstitial fluid pressure is higher than normal in such geopressured formations.

When a shale is exposed to an oil base emulsion drilling fluid, an osmotic hydration force arises whenever a salinity difference exists between the formation water and the aqueous phase of the drilling fluid. This may be an absorption or desorption force depending upon whether the drilling fluid salinity is lower or higher than the formation interstitial water. Oil base emulsion muds are a special case because the emulsified water phase is separated from direct contact with the formation, for example shale, by a semipermeable membrance as supplied by the oil-water interface defining the water droplets in the emulsion. Laboratory studies have shown that the surface hydration force of a shale is equal to the compacting force exerted on the shale while in place in the formation being drilled through. Based upon these considerations, I have discovered a rational method for determining the minimum salt concentration, (the most convenient salt being calcium chloride, although others may be used), for insuring stability of a given oil emulsion mud in contact with a given shale formation.

In the drawing, a quantitative relationship is shown by the family of curves in the graph, relating matrix stress to minimum salinity.

Generally speaking, and in accordance with an illustrative embodiment of my invention, I first determine the matrix stress of the formation to be drilled through. As previously noted, this may be taken, in pounds per square inch, as about one-half of the formation depth in feet. In many cases, data will be available from adjoining wells in the same field which may permit a closer estimate, although the approximation given is sufficient for practical purposes. I next determine the salinity of the interstitial water in the formation to be drilled through. In most cases, this will be done with considerable exactness, as it tends to be similar for a given formation over a considerable area. As will be clear from the foregoing discussion, the interstitial water salinity will have a corresponding osmotic pressure, which may be readily calculated or determined by inspection from a table.

The total water absorption force of a shale can be considered as the sum of surface hydration and osmotic hydration forces.

Now if the interstitial water were perfectly fresh, that is, substantially pure water without dissolved salts, the water absorption force of the shale would be equal to the matrix stress. In the general case, however, with some salinity of the interstitial water, the water absorption force will be increased by the osmotic pressure corresponding to that salinity. Accordingly, I select for the minimum salt concentration of the water phase of the oil emulsion mud, a concentration that will give an osmotic pressure at least equal to the matrix stress (expressed in units of pressure, such as pounds per square inch) plus the osmotic pressure corresponding to the salinity of the formation water (expressed in the same pressure unit, such as pounds per square inch). Depending on the salt selected, it is a simple matter to determine what concentration will be needed to give any required osmotic pressure.

The values required may be obtained by any given method, such as by using a mechanical calculator, a computer, a slide rule, and the like, that is, the operation of obtaining the output from the input figures may be completely mechanized if desired. Alternatively, and conveniently, the desired minimum salinity may be determined by inspection from the graph in the drawing.

In the drawing, a family of curves is shown having a typical range of interstitial water salinities, in terms of sodium chloride. The ordinate shows matrix stress in pounds per square inch. The required oil mud water phase salinity may be read off as an abscissa, using whichever curve corresponds to the interstitial salinity, interpolating if necessary. The drawing is for the most common oil emulsion mud electrolyte, calcium chloride; while the interstitial salinity is given for sodium chloride, which is almost universally present. Of course, for any other combination of electrolytes, calculations can be readily made as explained hereinabove.

The electrolyte is incorporated into the oil emulsion mud in any of the commonplace fashions. When such a mud is made up from the start, the required amount of electrolyte may be dissolved in the water prior to emulsification. Where the mud is already in use and is to be adjusted in salinity, the salinity may be lowered by adding water, which will gradually reach equilibrium with the aqueous phase already present; and when the electrolyte concentration must be increased, it may be added in the form of dry powdered salt or a concentrated solution thereof.

The inventive procedure may also be described using alternative nomenclature, although the process described is identical, the only change being in the terms used. Osmosity is the molar concentration of sodium chloride having the same osmotic pressure as a given solution. It is so defined, and tabulated for a number of salts, in the Handbook of Chemistry and Physics already cited, same page. Thus, my inventive process may be described as the adjusting of the osmosity of the aqueous phase of an oil base emulsion mud so that it has at least the same osmosity as corresponds to the osmosity corresponding to the matrix stress plus the osmosity of the formation interstitital water.

It will be clear that as already mentioned I may use mixtures of electrolytes in adjusting the real osmolality and thereby the osmosity of the aqueous phase of the oil base emulsion mud. A mixture of sodium chloride and calcium chloride, for example, offers no difficulty, since the osmotic pressure and real osmolality and osmosity can be as readily calculated as when a single salt is used.

Also, it is sometimes convenient to make use of a commercial osmometer for direct measurement of the osmolality of any electrolyte solution in question. Such a commercially available instrument is described on page 2 of Medical Electronic News, for July 1969.

As a specific example of the operation of the invention, and illustrating the use of the drawing, suppose that a well is being drilled at 8,000 feet total depth, and the matrix stress in accordance with the principles set forth hereinabove is estimated to be 4,000 pounds per square inch. Furthermore, suppose that the salinity of the interstitital water of the shale at this depth is 200,000 parts per million. From the graph of the drawing, it is seen that the curve for interstitial water salinity of 200,000 parts per million crosses the horizontal line corresponding to the matrix stress of 4,000 pounds per square inch at an oil-mud water-phase salinity of about 285,000 parts per million of calcium chloride. The latter figure accordingly is the proper concentration of calcium chloride for imparting the necessary osmotic pressure to the aqueous phase of the mud in accordance with the invention. The calcium chloride may be incorporated as previously described.

I wish it to be understood that I do not desire to be limited to the exact details of procedure shown and described, for obvious modifications will occur to a person skilled in the art.

I claim:

1. In a process of drilling a well through a shale bearing formation exhibiting a matrix stress pressure and containing an aqueous interstitial fluid by employing an oil base emulsion-drilling fluid possessing a dispersed aqueous phase, the improvement comprising adjusting the electrolyte content of said aqueous phase of said oil base emulsion-drilling fluid by the incorporation of a selected electrolyte therein in an amount sufficient to impart an osmotic pressure to said aqueous phase at least equal to the sum of said matrix stress pressure and the osmotic pressure of said aqueous interstitial fluid.

2. The process in accordance with claim 1 wherein said selected electrolyte is chosen from the class consisting of calcium chloride, sodium chloride, and mixtures thereof.

3. The method for balancing the water absorption force of a shale formation containing interstitial water and under a matrix stress as a result of compression and the water absorption force of an oil base emulsion-drilling fluid containing a dispersed aqueous phase in contact with said shale formation which consists of establishing the electrolyte content of the said aqueous phase of the emulsion drilling fluid at a value such that the osmotic pressure of the mud is substantially equal to the sum of said matrix stress of the said shale formation and the osmotic pressure of said interstitial water in the shale.

4. The process in accordance with claim 3 wherein said selected electrolyte is chosen from the class consisting of calcium chloride, sodium chloride, and mixtures thereof.